(12) United States Patent
Allison et al.

(10) Patent No.: US 7,700,176 B2
(45) Date of Patent: *Apr. 20, 2010

(54) POROUS CARPETING FOR VEHICLES AND METHODS OF PRODUCING SAME

(75) Inventors: Timothy J. Allison, Old Fort, NC (US); Carroll Owenby, Old Fort, NC (US); Jack Davis, Old Fort, NC (US)

(73) Assignee: International Automotive Components Group North America, Inc., Dearborn, MI (US)

(*) Notice: Subject to any disclaimer, the term of this patent is extended or adjusted under 35 U.S.C. 154(b) by 138 days.

This patent is subject to a terminal disclaimer.

(21) Appl. No.: 10/888,963

(22) Filed: Jul. 9, 2004

(65) Prior Publication Data

US 2004/0234685 A1    Nov. 25, 2004

Related U.S. Application Data

(62) Division of application No. 10/253,373, filed on Sep. 24, 2002, now Pat. No. 6,821,366.

(60) Provisional application No. 60/333,594, filed on Nov. 26, 2001.

(51) Int. Cl.
*B32B 33/00* (2006.01)
*B32B 3/10* (2006.01)
*B32B 3/24* (2006.01)

(52) U.S. Cl. ............................. 428/95; 428/88; 428/131; 428/137; 428/138

(58) Field of Classification Search ................... 428/95, 428/88, 131, 137, 138
See application file for complete search history.

(56) References Cited

U.S. PATENT DOCUMENTS

| | | | |
|---|---|---|---|
| 4,112,161 A * | 9/1978 | Sorrells | 428/95 |
| 6,616,789 B2 * | 9/2003 | Price et al. | 156/245 |
| 6,723,413 B2 * | 4/2004 | Walters | 428/95 |
| 6,821,597 B1 * | 11/2004 | Price et al. | 428/95 |
| 2002/0172795 A1 | 11/2002 | Gardner et al. | 428/85 |
| 2004/0048036 A1 * | 3/2004 | Nakasuji et al. | 428/95 |
| 2004/0265566 A1 * | 12/2004 | Wyerman | 428/317.9 |
| 2005/0051264 A1 * | 3/2005 | Allison et al. | 156/272.2 |
| 2005/0064779 A1 * | 3/2005 | Allison et al. | 442/181 |

FOREIGN PATENT DOCUMENTS

| | | |
|---|---|---|
| GB | 2140047 A | 11/1984 |
| JP | 4105611 A | 4/1992 |

OTHER PUBLICATIONS

Moody and Needles, Tufted Carpet: Textile Fibers, Dyes, Finishes, and Processes, 2004, William Andrew Publishing, pp. 125-131.*
International Search Report for PCT/US02/31853.

* cited by examiner

*Primary Examiner*—Cheryl Juska
(74) *Attorney, Agent, or Firm*—Myers Bigel Sibley & Sajovec, P.A.

(57) ABSTRACT

Porous carpeting for use within vehicles, and methods of making same, are provided. A carpet backing is heated to achieve a fluid or semi-fluid state and then subjected to intense vacuum to draw air through the carpet backing to create a porous structure. A layer of porous thermoformable material may be applied to the porous carpet structure to provide mechanical strength.

8 Claims, 4 Drawing Sheets

POROUS CARPETING FOR VEHICLES AND METHODS OF PRODUCING SAME

RELATED APPLICATION

This application is a Divisional application of U.S. patent application Ser. No. 10/253,373 filed Sep. 24, 2002, now U.S. Pat. No. 6,821,366 which is incorporated herein by reference in its entirety.

RELATED APPLICATION

This application claims the benefit of U.S. Provisional Application No. 60/333,594, filed Nov. 26, 2001, the disclosure of which is incorporated herein by reference in its entirety as if set forth fully herein.

FIELD OF THE INVENTION

The present invention relates generally to vehicles and, more particularly, to methods of producing carpeting utilized within vehicles.

BACKGROUND OF THE INVENTION

It is generally considered desirable to reduce the level of noise within a vehicle passenger compartment. External noises, such as road noise, engine noise, vibrations, etc., as well as noises emanating from within passenger compartments, may be attenuated through the use of various acoustical materials. Accordingly, sound attenuating materials for vehicles, such as automobiles, are conventionally used in dashboards, in conjunction with carpeting for floor panels, in wheel wells, in trunk compartments, under hoods, as part of headliners, etc.

The attenuation of external noise (i.e., noise emanating from a source external to a vehicle compartment) is conventionally referred to as sound transmission loss (STL). The attenuation of internal noise (i.e., noise emanating from within a vehicle compartment) is conventionally referred to as sound absorption. The acoustic impedance of a material is defined as material density times acoustic velocity, and is expressed in units of Rayls (Newton-seconds/meter$^3$). Acoustic impedance defines how easy it is for air to move through a material. Thus, for fibrous materials, acoustic impedance may depend upon the density of the fibrous material and fiber diameter. Generally, the heavier the blanket and the finer the fibers, the higher the acoustic impedance. Moreover, thicker layers typically have more acoustic impedance than thin layers. The ability of a material to attenuate noise is conventionally defined by the material's collective STL, acoustic impedance, and absorption characteristics.

Carpeting for use within vehicles is conventionally tufted or nonwoven. Tufted carpet generally includes a composite structure in which tufts, or bundles of carpet fibers are introduced (such as by stitching) into a primary backing, such as a woven or non-woven fabric. A secondary backing or coating of thermoplastic material is then applied to the underside of the carpet construction in order to securely retain the tufted material in the primary backing. This secondary backing not only dimensionally stabilizes the construction but can also provide greater abrasion and wear resistance, and may serve as an adhesive for an additional layer of material. Nonwoven carpet is composed of fiber that is mechanically entangled by needling, water jet, or other process.

Vehicle carpeting is conventionally molded into a non-planar three dimensional contoured configuration which conforms to the contours of a vehicle floor. A secondary coating of thermoplastic material applied to the primary backing may also make the carpeting moldable and shape-sustaining, and may also serve as a barrier to improve the sound attenuating properties of the carpeting.

Conventional vehicle carpeting typically includes an ethylene-vinylacetate (EVA), polyethylene (PE), or polyvinylchloride (PVC) layer which serves as a barrier sheet. Unfortunately, there are several drawbacks associated with the use of EVA, PE, and PVC layers in these vehicle applications. For example, EVA, PE, and PVC are non-porous materials which can be relatively heavy when applied to carpeting, dash insulators, and other interior trim components.

In general, the ability of conventional vehicle carpeting to attenuate sound increases as the amount of material increases. Unfortunately, increased carpeting material often increases the weight as well as the cost of vehicle carpeting, which is typically undesirable. Accordingly, there is a continuing need for carpet materials for use within vehicles that exhibit good sound attenuating properties and that are also lightweight and low in cost.

SUMMARY OF THE INVENTION

In view of the above discussion, porous carpet for use within vehicles and methods of producing same are provided. According to embodiments of the present invention a primary layer of thermoplastic fibrous material (woven or non-woven) is provided. The primary layer has opposite first and second sides, with fiber (e.g., yarn, etc.) tufts extending outwardly from the first side. The primary layer may be heated (although not required) to a predetermined temperature (e.g., about 150° F. to about 250° F.). A secondary layer of thermoplastic material (e.g., polyethylene, ethylene vinyl acetate, etc.) having a temperature of between about 350° F. and about 500° F. is applied to the primary layer such that the secondary layer penetrates the primary layer up to about 90% of a thickness of the primary layer and forms a carpet backing. The carpet backing is then heated to a temperature sufficient to cause the carpet backing to achieve a fluid state. The heated carpet backing is then subjected to sufficient vacuum such that air is drawn through the heated carpet backing to create a porous carpet structure.

According to embodiments of the present invention, a layer of porous thermoformable material may be applied to the porous carpet backing to hold the porous carpet backing open such that air can flow therethrough and to provide additional mechanical strength. The layer of porous thermoformable material may be fibrous material selected from the group consisting of natural fibers, man-made fibers, and blends of natural fibers and man-made fibers.

Porous carpet according to embodiments of the present invention can provide desired sound deadening and absorption properties within vehicles. Moreover, porous carpet according to embodiments of the present invention may have reduced overall weight without sacrificing sound attenuating properties.

BRIEF DESCRIPTION OF THE DRAWINGS

The accompanying drawings, which form a part of the specification, illustrate embodiments of the present invention. The drawings and description together serve to fully explain the invention.

DETAILED DESCRIPTION OF THE INVENTION

Figure 1:
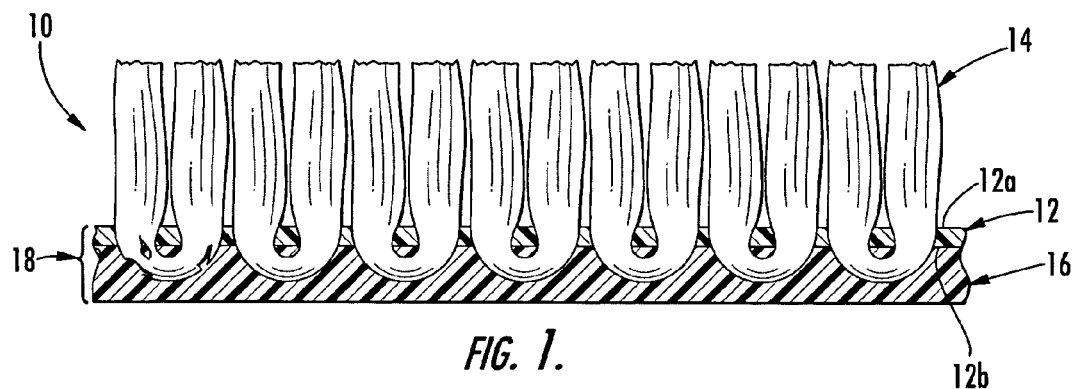
FIG. 1 is a cross-sectional view of a portion of tufted carpet, wherein a secondary layer of thermoplastic material has been added to a primary layer of thermoplastic material to form a carpet backing, according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like when used herein are for the purpose of explanation only.

Embodiments of the present invention provide porous carpet for use within vehicles, such as automobiles, and methods of producing same. Porous carpet according to embodiments of the present invention is particularly useful for absorbing sound produced within a vehicle and for serving as a barrier to sound emanating from sources external to a vehicle. Exemplary automotive applications within which porous carpet produced according to embodiments of the present invention may be utilized include, but are not limited to, floor coverings, trunk liners, spare tire covers, etc. Non-tufted carpeting may be provided with a porous structure according to embodiments of the present invention. The present invention is not limited to providing porosity within tufted carpeting.

Referring now to FIG. 1, a section view of a portion of a tufted carpet 10 is illustrated. The tufted carpet includes a primary layer 12 of thermoplastic fibrous material having opposite first and second sides 12a, 12b. Yarn tufts 14 extend outwardly from the primary layer first side 12a, as illustrated. The primary layer 12 may be a woven matrix of thermoplastic fibrous material or a non-woven matrix of thermoplastic fibrous material (e.g., spunbonded or spunlaced), etc. Thermoplastic fibrous materials from which the primary layer 12 may be formed include any natural or synthetic material compatible with a tufting process and that can withstand processing temperatures in excess of 200° F., and preferably in excess of 400° F. Exemplary thermoplastic fibrous materials from which the primary layer 12 may be formed include, but are not limited to, polyester, nylon, polypropylene, and/or blends thereof, and are available from Frudenburg Spunweb Co., Durham, N.C. and Colbond Geosynthetics, Enka, N.C.

Tufted carpet utilized in accordance with embodiments of the present invention preferably has tuft densities of between about one-eighth gauge and about one-sixteenth gauge. As is known to those skilled in the art, the term "gauge" refers to the number of rows of tufts per unit of measure. For example, one-tenth gauge means that there is a row of tufts every one-tenth of an inch. However, various tuft densities may be utilized. Embodiments of the present invention are not limited to a particular tuft density or to a particular range of tuft densities. The greater the tuft density, the greater the ability to pull air through a carpet such that the material structure of the carpet can be modified, as will be described below.

Typical nonwoven carpet for automotive applications range between about 4 and about 30 ounces per square yard, but are not limited to this range. Nonwoven carpet can be composed of various fiber types including, but not limited to, polyester, nylon, polypropylene, wool, cotton, and blends thereof.

Figure 2:
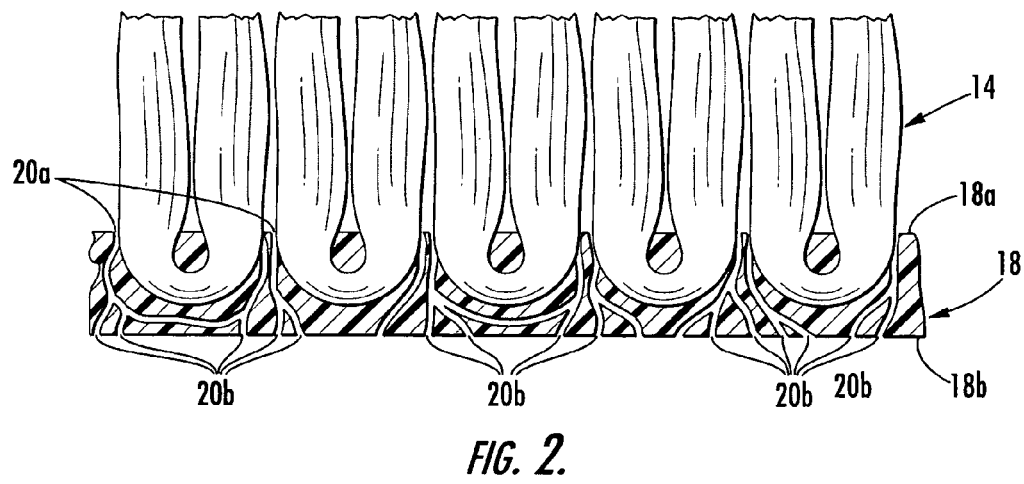
FIG. 2 is an enlarged view of a portion of the carpeting of FIG. 1 illustrating air channels formed within the carpet backing in accordance with embodiments of the present invention.

A secondary layer (or precoat) 16 of thermoplastic material is attached to the primary layer second side 12b as illustrated. The secondary layer 16 is attached to the primary layer 12 in a heated condition such that the secondary layer 16 penetrates the primary layer 12 up to about 90% of a thickness of the primary layer 12 and forms a carpet backing, generally referred to as 18. FIG. 2 illustrates the carpet backing 18 as a single layer of material after the secondary layer 16 has penetrated the primary layer 12.

The secondary layer 16 may be polyethylene (e.g., linear low density polyethylene (LLDPE), low density polyethylene (LDPE), medium density polyethylene (MDPE), high density polyethylene (HDPE)), ethylene vinyl acetate (EVA), polyester, polyolefin, and blends thereof, as well as other polymers capable of meeting the process requirements for extrusion and reheat, including TPO (thermoplastic olefin), TPE (thermoplastic elastomer), and ESI (ethylene styrene interpolymer), and blends thereof. An exemplary secondary layer 16 material is a 220 melt index low density polyethylene, such as AT 192, available from AT Polymers, Brampton, Ontario-Canada. The secondary layer 16 material may have a melt index range of between about 4 and about 500 melt index. However, lower or higher melt indexes may be used if they meet process requirements. The secondary layer 16 material may be applied in an amount of between about 5 ounces per square yard and about 14 ounces per square yard.

As will be described below, the carpet backing 18 has a porous structure caused by forcing air through the carpet backing 18 when in a fluid or semi-fluid state. FIG. 2 is an enlarged view of a portion of the carpet 10 of FIG. 1 that illustrates air channels 20 that have been created through the carpet backing 18. Air channel formation originates from holes created by the tufts 14 in the primary layer 12 (FIG. 1). Thus, the greater the tuft density, the greater the number of air channels 20 that can be created and, thus, the greater the porosity of the carpet backing 18. Air channels 20 extend through the carpet backing 18 and terminate at respective apertures 20a, 20b in the respective sides 18a, 18b of the carpet backing 18.

Figure 3:
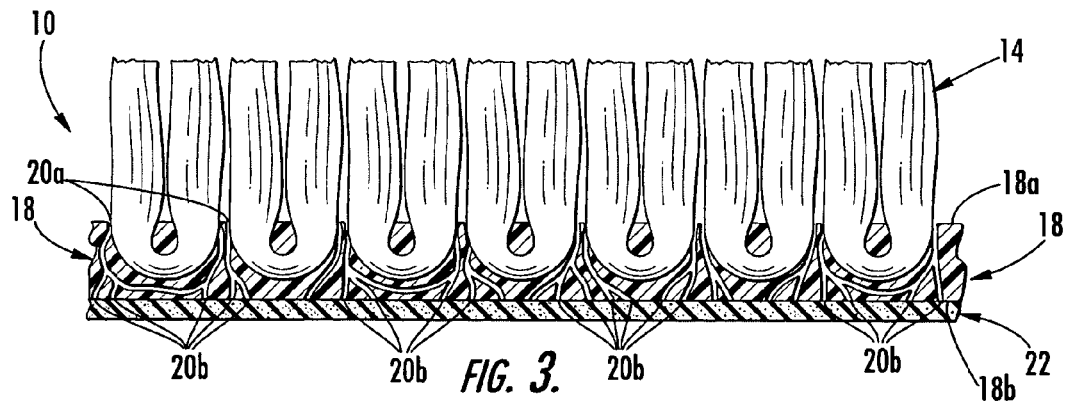
FIG. 3 illustrates the porous tufted carpet of FIG. 2 with a secondary layer attached to the carpet backing.

According to embodiments of the present invention, a layer 22 of porous thermoformable material may be attached to the carpet backing 18, as illustrated in FIG. 3. The layer 22 has a porous configuration and is configured to hold the porous carpet backing 18, having air channels 20 formed therein, open such that air can flow therethrough. The addition of layer 22 provides a thicker cross section that allows more area for the polyethylene coating. The more area/polyethylene, the stiffer the composite can be while maintaining porosity. In addition, the layer 22 can provide additional mechanical strength to the carpet backing 18. The layer 22 is configured to be attached to a vehicle panel (e.g., a floor panel) in contacting face-to-face relationship therewith.

The layer 22 can serve the function of a binder such that the porous carpet backing can maintain a shape imposed upon it via molding and/or other forming operations. The layer 22 may be formed from any type of material including, but not limited to foam (e.g., polyurethane foam, thermoplastic foam, etc.), massback, and other thermoformable fibrous materials including those derived from natural fibers, man-made fibers, and/or blends of natural fiber and man-made fibers. Exemplary secondary layers include Frudenberg 7220, Frudenburg Spunweb Co., Durham, N.C. and Colbond CD50, Colbond Geosynthetics, Enka, N.C.

Figure 4:
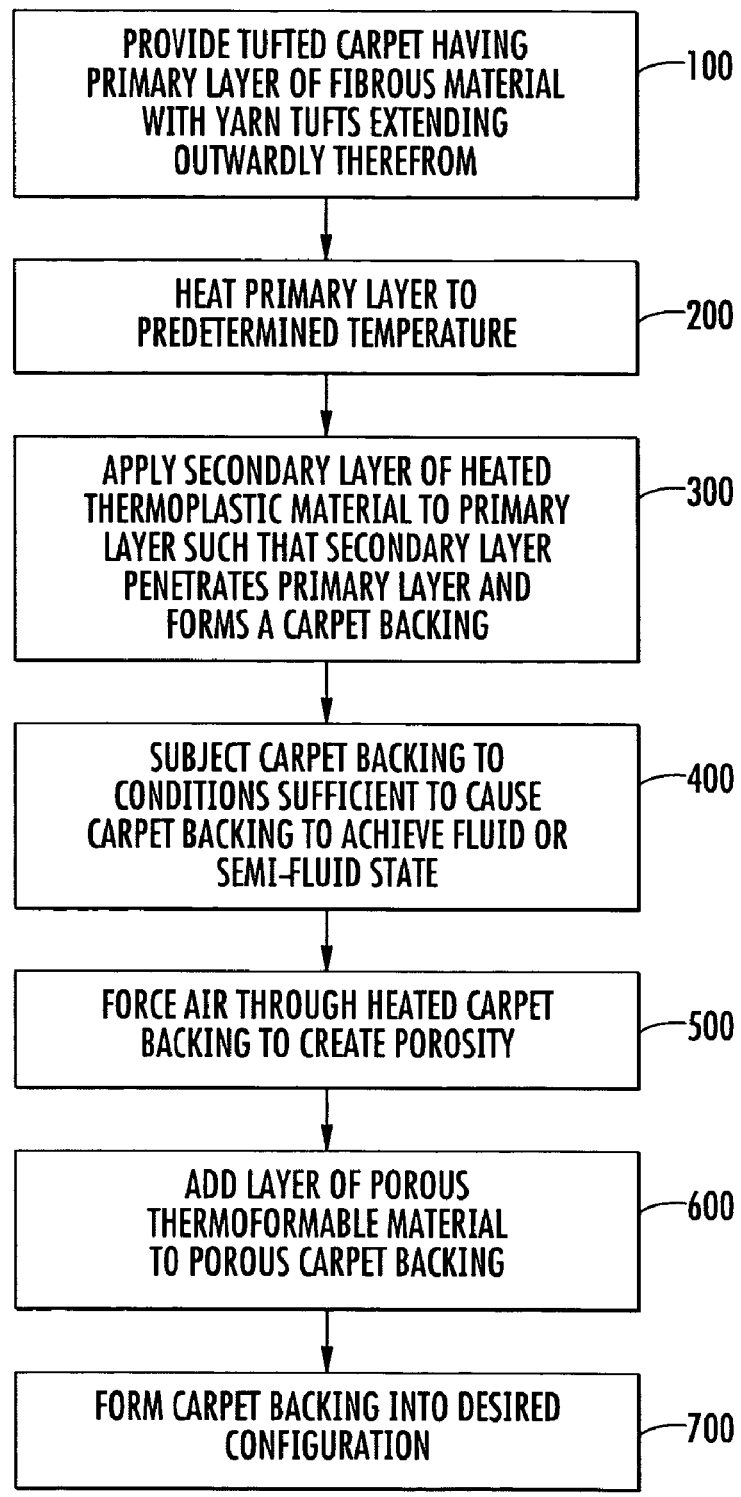
FIG. 4 is a flowchart of operations for producing porous tufted carpeting according to embodiments of the present invention.

Referring now to FIG. 4, operations for producing porous tufted carpet for use within vehicles, according to embodiments of the present invention, are illustrated. A carpet consisting of a primary layer of fibrous material (e.g., a woven or non-woven matrix of thermoplastic fibers) with yarn tufts extending outwardly from a first side thereof are provided (Block 100). The yarn tufts preferably have a density of between about one-eighth gauge and about one-sixteenth gauge.

The primary layer may be heated to a predetermined temperature (Block 200). An exemplary range is between about 150° F. and about 280° F., and a particularly preferred range is between about 160° F. and about 220° F. However, it is not required that the primary layer be heated.

A secondary layer of thermoplastic material having a temperature of between about 350° F. and about 500° F. is applied (e.g., via extrusion, etc.) to the primary layer second side such that the secondary layer penetrates the primary layer and forms a carpet backing (Block 300). A particularly preferred temperature range for the secondary layer is between about 400° F. and 450° F.

The secondary layer is preferably applied in the amount of between about 5 and 14 ounces per square yard. However, other application ranges may be utilized without limitation. Preferably, the secondary layer penetrates the primary layer by up to about 90% of the thickness of the primary layer. As described above, exemplary thermoplastic materials which may be used as a secondary layer include, but are not limited to, LLDPE, LDPE, MDPE, HDPE, polyester, polyolefin, etc.

The carpet backing is then subjected to conditions sufficient to cause the carpet backing to achieve a fluid or semi-fluid (i.e., flowable) state (Block 400). Thermoplastic materials have a wide range of melt flow rates. High melt flow rate materials typically flow easier and form air channels easier than low melt flow rate materials. Accordingly, processing temperatures are dependent on materials utilized. Reheat temperature required will be dependent upon the thermoplastic coating material and will vary accordingly. Other ways of causing the carpet backing to achieve a fluid state may include applying microwave, infrared, or other electromagnetic energy to the carpet backing.

Once in a fluid or semi-fluid state, air flow of sufficient flow and velocity is forced through the heated carpet backing to create porosity therein (Block 500). According to embodiments of the present invention, air flow may be provided through the heated carpet backing by subjecting the carpet backing to vacuum. The vacuum causes air to be drawn through the carpet backing thereby creating porosity through the entire carpet backing. Vacuum may range from between about 0 inches of mercury to about 15 inches of mercury, depending on the particular types of material in the carpet backing and depending on the temperature of the carpet backing. Other methods of providing air flow through the heated carpet backing may be utilized as well, such as forced air flow via fans, nozzles, etc. Embodiments of the present are not limited to subjecting the heated carpet backing to vacuum.

According to embodiments of the present invention, a layer of porous thermoformable material can be added to the porous carpet backing to provide mechanical strength and/or to maintain the porosity of the carpet web (Block 600). According to embodiments of the present invention, a layer of porous thermoformable material may include fibrous material selected from the group consisting of natural fibers, man-made fibers, and blends of natural fiber and man-made fibers. The carpet backing may also be formed into various configurations as required (Block 700). Exemplary forming operations include trimming the carpeting to specified dimensions, rolling the carpeting into rolls, cutting the carpeting into specified sizes and lengths, and molding/fabricating the carpeting into a three-dimensional carpeting assembly which generally corresponds to the configuration of at least a portion of a vehicle floor and/or trunk, as would be understood by those skilled in the art.

Figure 5:
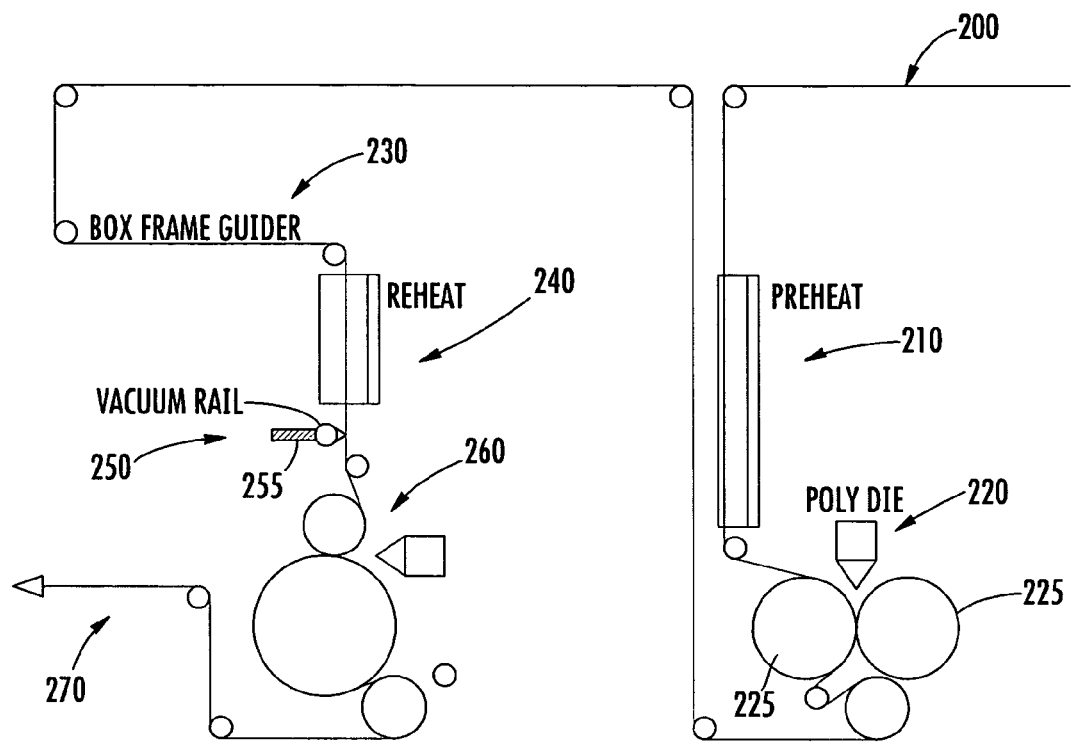
FIG. 5 is a block diagram that illustrates extrusion systems and processes for forming porous tufted carpeting according to embodiments of the present invention.

FIG. 5 is a block diagram that illustrates extrusion systems and processes for forming porous tufted carpet according to embodiments of the present invention. At 200 rolls of tufted carpet 10 (i.e., carpet having a primary layer with a plurality of tufts extending from a side thereof as illustrated in FIG. 1) are joined together (e.g., sewn together, etc.) to facilitate continuous extrusion processing. At 210 the primary layer 12 (FIG. 1) may or may not be heated to achieve the desired result. If heat is required, the typical heat range is between about 150° F. and 280° F., although other temperatures may be utilized.

At 220 a secondary layer 16 (FIG. 1) of thermoplastic material having a temperature of between about 350° F. and about 500° F. is extruded onto the primary layer 12 such that the secondary layer 16 penetrates the primary layer 12 and forms a carpet backing 18 (FIGS. 1-2). Preferably, rolls 225 have a temperature within the range of between about 55° F. and about 120° F. However, the higher the temperature of the rolls 225, the more the secondary layer 16 of thermoplastic material penetrates into the primary layer 12.

At 230 the carpet backing 18 is guided via a box frame guider that is configured to ensure a consistent seal of the carpet backing with a vacuum rail (described below). At 240 the carpet backing 18 is heated to a temperature sufficient to cause the carpet backing 18 to become flowable (i.e., achieve a fluid or semi-fluid state). The temperature required to achieve a fluid/semi-fluid state is dependent on the carpet backing material. A typical heating range is between about 230° F. and about 270° F. Typically, higher temperatures will produce a more porous carpet backing.

Figure 6:
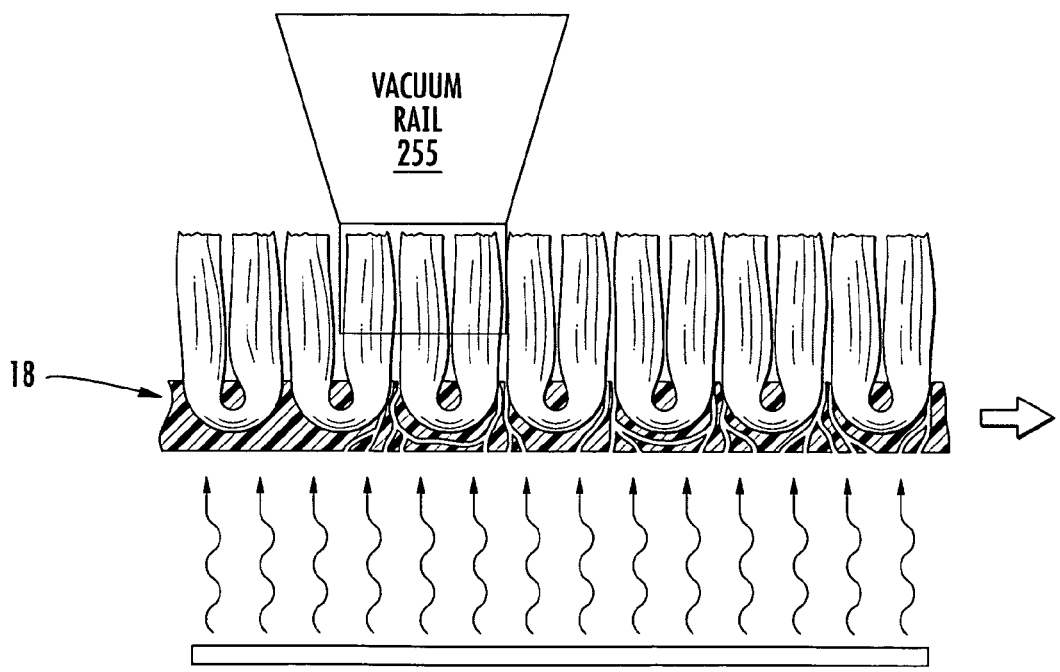
FIG. 6 illustrates the carpet backing of FIG. 1 being passed through a vacuum system that is configured to draw air through the carpet backing according to embodiments of the present invention.

At 250 the heated carpet backing passes adjacent to a vacuum rail 255 having a slot therein and which is configured to generate vacuum of between about 0-15 inches of mercury through the slot. FIG. 6 illustrates the carpet of FIG. 1 passing adjacent to a vacuum rail 255 that is configured to draw air through the carpet backing 18 to form air channels 20.

Figure 7:
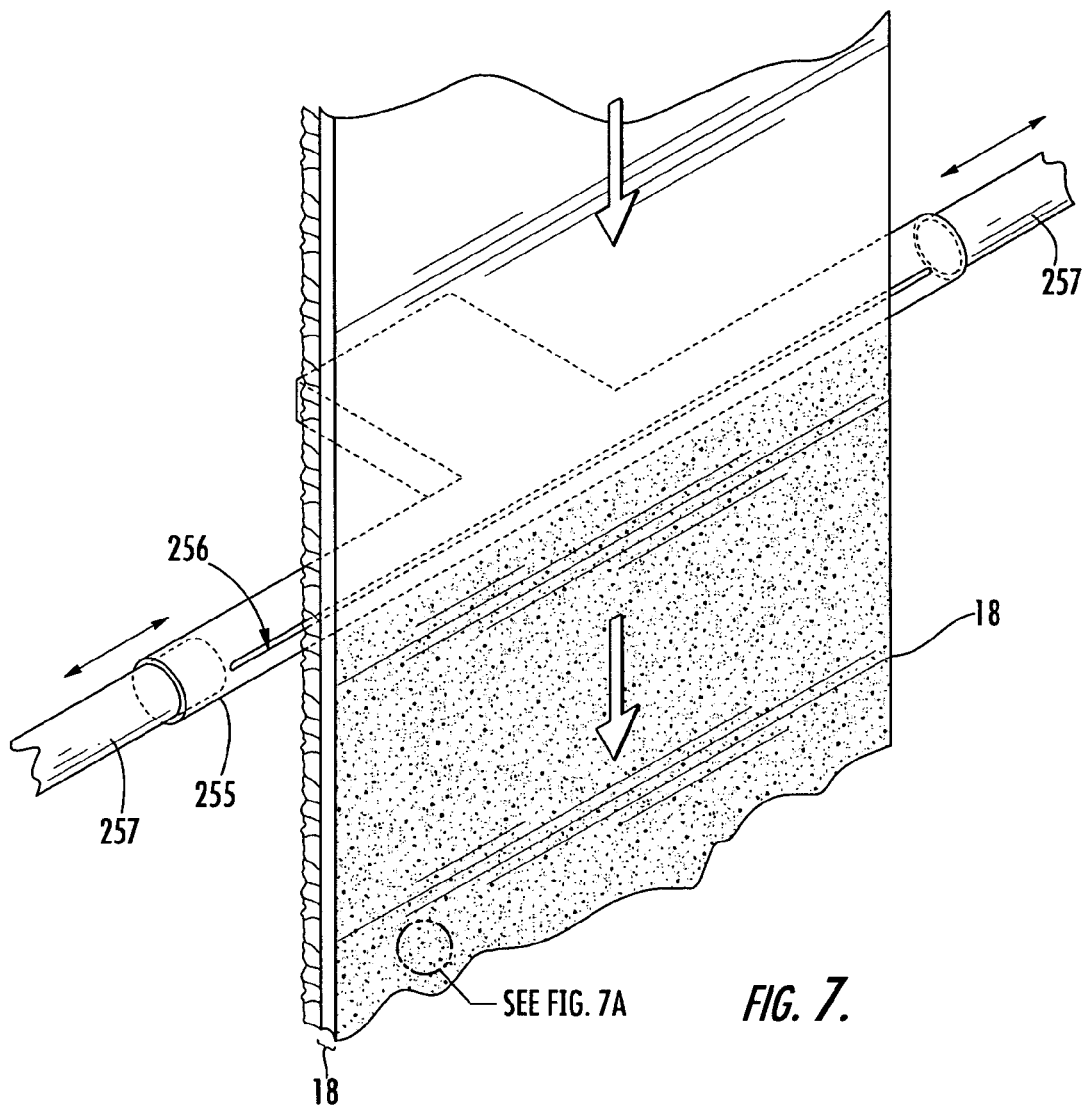
FIG. 7 is an enlarged perspective view of a vacuum rail that can be utilized in accordance with embodiments of the present invention to apply vacuum to a heated carpet backing to create porosity therein according to embodiments of the present invention.
Figure 7A:
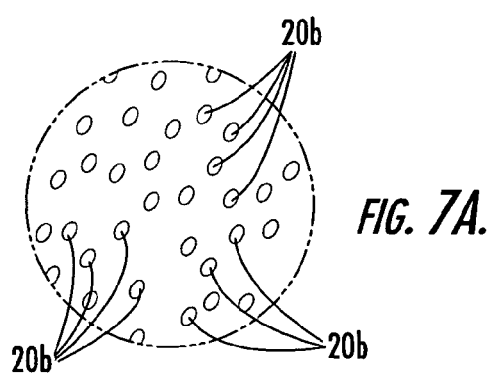
FIG. 7A is an enlarged portion of the carpet of FIG. 7 that illustrates apertures of air channels that have formed in the backing of the carpet as the carpet passes by the vacuum rail.

FIG. 7 illustrates an exemplary vacuum rail 255 that can be utilized in accordance with embodiments of the present invention to apply vacuum to a heated carpet backing to create a porous structure therein. FIG. 7A is an enlarged portion of the carpet of FIG. 7 that illustrates apertures 20b of air channels 20 that have formed in the backing 18 of a carpet 10 as the carpet 10 passes by the vacuum rail 255.

The illustrated vacuum rail 255 includes a slot 256 having a width that is variable so as to be adjustable to the width of a carpet backing. In the illustrated embodiment, slot width is controlled by deckles 257 that slide within the rail 255 to close or open the slot 256 to a desired width. According to other embodiments of the present invention, deckles 257 may be configured to slide external to the rail 255 to close or open the slot 256 to a desired width. Deckles 257 may have various shapes and configurations and may be controlled in various ways.

The vacuum rail 255 may be in communication with virtually any type of vacuum source capable of generating between about 0 and 15 inches of mercury. An exemplary vacuum source is a Vacuum Blower Package, HS Design, available from Industrial Accessories Company, Mission, Kans. Various ways of applying vacuum may be utilized. Embodiments of the present invention are not limited to the illustrated vacuum rail 255.

Referring back to FIG. 5, at 260 a secondary layer may be attached to the porous carpet backing 18. At 270 various processing operations may occur. For example, the porous carpet backing may be trimmed to a desired width and/or length, rolled into rolls, or cut into blanks of various lengths. In addition, molding operations may occur to create a molded carpet assembly configured to be installed within a vehicle.

Porous, tufted carpeting according to embodiments of the present invention can enhance sound attenuation. For example, sound generated within a vehicle can be absorbed by the carpeting to provide a quieter environment within the vehicle. Carpet porosity formed in accordance with embodiments of the present invention can achieve between about 150 Rayls and about 10,000 Rayls of sound attenuation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A porous tufted carpet, comprising:
    a backing layer of fibrous material having opposite first and second sides and a plurality of fiber tufts that extend outwardly from the first side, wherein the backing layer is formed by applying a layer of heated thermoplastic material to a side of a layer of fibrous material having a plurality of yarn tufts extending outwardly from an opposite side thereof, wherein the heated layer of thermoplastic material penetrates the layer of fibrous material; and
    a plurality of air channels formed in the backing layer that extend between the first and second sides of the backing layer, wherein the plurality of air channels each terminate at a respective single aperture in the first side of the backing layer and at multiple apertures in the second side of the backing layer.

2. The carpet of claim 1, further comprising a layer of porous thermoformable material attached to the backing layer second side, wherein the porous material can maintain a shape imposed upon it.

3. The carpet of claim 1, wherein the backing layer of fibrous material comprises a matrix of thermoplastic fibers.

4. The carpet of claim 3, wherein the matrix comprises a woven matrix of thermoplastic fibers.

5. The carpet of claim 3, wherein the matrix comprises a non-woven matrix of thermoplastic fibers.

6. The carpet of claim 2, wherein the layer of porous thermoformable material comprises fibrous material selected from the group consisting of natural fibers, man-made fibers, and blends of natural fiber and man-made fibers.

7. The carpet of claim 1, wherein the carpet has an acoustic impedance of between about 150 Rayls and about 10,000 Rayls.

8. The carpet of claim 1, wherein the carpet comprises a tuft density of between about one-sixteenth gauge and about one-eight gauge.

\* \* \* \* \*